(12) United States Patent
Fairgrieve et al.

(10) Patent No.: US 10,259,460 B2
(45) Date of Patent: Apr. 16, 2019

(54) VEHICLE SPEED CONTROL SYSTEM AND METHOD

(71) Applicant: Jaguar Land Rover Limited, Whitley, Coventry, Warwickshire (GB)

(72) Inventors: Andrew Fairgrieve, Rugby (GB); James Kelly, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 262 days.

(21) Appl. No.: 15/113,158

(22) PCT Filed: Jan. 13, 2015

(86) PCT No.: PCT/EP2015/050443
§ 371 (c)(1),
(2) Date: Jul. 21, 2016

(87) PCT Pub. No.: WO2015/110309
PCT Pub. Date: Jul. 30, 2015

(65) Prior Publication Data
US 2017/0001645 A1    Jan. 5, 2017

(30) Foreign Application Priority Data

Jan. 24, 2014  (GB) .................................. 1401183.7

(51) Int. Cl.
*B60W 30/18*       (2012.01)
*B60K 28/16*       (2006.01)
(Continued)

(52) U.S. Cl.
CPC ....... *B60W 30/18172* (2013.01); *B60K 28/16* (2013.01); *B60T 8/175* (2013.01);
(Continued)

(58) Field of Classification Search
CPC .......... B64F 5/60; B64F 5/0045; B64D 45/00; G05B 23/024; G05B 23/0283; G07C 5/085
(Continued)

(56) References Cited

U.S. PATENT DOCUMENTS 4,951,208 A    8/1990  Etoh
4,987,966 A    1/1991  Fujita
(Continued)

FOREIGN PATENT DOCUMENTS

CN    102218988 A    10/2011
CN    102529958 A    7/2012
(Continued)

OTHER PUBLICATIONS

Chinese Office Action in Chinese application No. 2015800057873, dated May 24, 2018, with translation, 16 pages.
(Continued)

*Primary Examiner* — Muhammad Shafi
(74) *Attorney, Agent, or Firm* — Reising Ethington P.C.

(57) ABSTRACT

A vehicle control system comprising a speed control system and a traction control (TC) system, the TC system being operable to cause a reduction in speed of one or more wheels when a speed of the one or more wheels exceeds a TC system intervention threshold value, the speed control system being operable in an active state in which the speed control system causes the vehicle to operate in accordance with a target speed value, wherein when the speed control system is in the active state, the TC system intervention threshold value is set to a value selected in dependence at least in part on the target speed value.

17 Claims, 6 Drawing Sheets

(51) Int. Cl.
 *B60T 8/175* (2006.01)
 *B60W 30/14* (2006.01)
 *B60W 10/184* (2012.01)
(52) U.S. Cl.
 CPC ........ *B60W 10/184* (2013.01); *B60W 30/143* (2013.01); *B60T 2210/16* (2013.01); *B60W 2520/10* (2013.01); *B60W 2520/28* (2013.01); *B60W 2550/12* (2013.01); *B60W 2550/148* (2013.01); *B60W 2710/12* (2013.01); *B60W 2720/103* (2013.01); *B60W 2720/30* (2013.01)
(58) Field of Classification Search
 USPC .......................................................... 701/29
 See application file for complete search history.

(56) References Cited

U.S. PATENT DOCUMENTS

| | | | |
|---|---|---|---|
| 5,245,542 | A | 9/1993 | Itoh et al. |
| 5,555,499 | A * | 9/1996 | Yamashita ............. B60K 28/16 180/197 |
| 5,737,714 | A | 4/1998 | Matsuno et al. |
| 8,504,238 | B2 | 8/2013 | Yu et al. |
| 8,554,440 | B1 * | 10/2013 | Davis ..................... B60K 28/16 701/82 |
| 8,751,131 | B2 | 6/2014 | Reynolds et al. |
| 8,886,431 | B2 | 11/2014 | Matsushita |
| 2003/0154013 | A1 * | 8/2003 | Ohtsu ................ B60K 23/0808 701/89 |
| 2003/0213629 | A1 * | 11/2003 | Sauter .................... B60K 28/16 180/197 |
| 2004/0041469 | A1 * | 3/2004 | Ishikawa ................ B60K 28/16 303/139 |
| 2007/0010929 | A1 * | 1/2007 | Takeda ................... B60K 28/16 701/82 |
| 2008/0120003 | A1 * | 5/2008 | Nihei ..................... B60W 10/08 701/69 |
| 2011/0257847 | A1 | 10/2011 | Uematsu et al. |
| 2012/0197506 | A1 | 8/2012 | Reynolds et al. |

FOREIGN PATENT DOCUMENTS

| | | |
|---|---|---|
| CN | 1025299582 A | 7/2012 |
| CN | 102782287 A | 11/2012 |
| DE | 102010-028486 * | 11/2011 |
| DE | 102010028486 A1 | 11/2011 |
| GB | 2392995 A | 3/2004 |
| JP | H02175371 A | 7/1990 |
| JP | H02189236 A | 7/1990 |
| JP | H07112634 A | 5/1995 |
| JP | H08225029 A | 9/1996 |
| JP | H09240447 A | 9/1997 |
| JP | 2000052804 A | 2/2000 |
| JP | 2010221917 A | 10/2010 |
| JP | 2012192919 A | 10/2012 |
| WO | WO2013076902 A1 | 5/2013 |
| WO | WO2013182695 A1 | 12/2013 |

OTHER PUBLICATIONS

Japanese Office Action in Japanese with English summary corresponding to JP application No. 2016-548011, dated Aug. 28, 2018, 6 pages.
Japanese Office Action in Japanese with English summary for JP application No. 2016-548011, dated Oct. 17, 2017, 6 pages.
Chinese Office Action in Chinese with English translation for CN application No. 201580005787.3, dated Dec. 4, 2017, 17 pages.
Combined Search and Examination Report corresponding to application No. GB1401183.7, dated Aug. 11, 2014, 6 pages.
International Search Report corresponding to International application No. PCT/EP2015/050443, dated Jun. 17, 2015, 5 pages.
Written Opinion corresponding to International application No. PCT/EP2015/050443, dated Jun. 17, 2015, 7 pages.
Combined Search and Examination Report corresponding to application No. GB1500475.7, dated Jun. 18, 2015, 6 pages.

* cited by examiner

VEHICLE SPEED CONTROL SYSTEM AND METHOD

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

The content of co-pending UK patent no GB2507622 and U.S. Pat. No. 7,349,776 are hereby incorporated by reference.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common. Known TC systems are arranged to intervene and cause application of brake force to reduce wheel speed if the speed of any driven wheel (being a wheel driven by the powertrain, i.e. a driving wheel) exceeds a measured value of vehicle speed, referred to as a vehicle reference speed, by more than a prescribed threshold value (such as 5 kph). The vehicle reference speed may also be used by one or more other vehicle systems that require knowledge of instant vehicle speed.

The present applicant has developed a speed control system suitable for use in off-road driving conditions. The speed control system is configured to allow driving at relatively low speeds, such as speeds in the range from 2 to 30 kph at least, and is configured not to terminate speed control if a wheel slip event is detected requiring intervention by a TC system.

Known speed control systems typically employ a closed loop feedback control arrangement to maintain vehicle reference speed substantially equal to the speed control system target speed. In known cruise control systems, for example, the feedback control arrangement generates a powertrain torque demand signal to cause the value of vehicle reference speed to remain substantially equal to a cruise control target speed.

Methods for determining and providing a value of vehicle reference speed are well known in the art. In some known vehicles the vehicle reference speed value, being an estimated value of vehicle speed over ground, is calculated based on a speed of each wheel, optionally in combination with a measurement of vehicle longitudinal acceleration.

In the case of a two wheel drive vehicle having four wheels, slip of driving wheels, being wheels driven by the powertrain, can be detected as a difference in wheel speed between the driving wheels and wheels that are not driven by the powertrain, on the assumption that the speed of the driving wheels will be greater than that of the non-driving wheels when a slip event occurs. In addition, an expected value of vehicle acceleration for a given amount of wheel torque at the driving wheels may be compared with actual vehicle acceleration as determined by means of an accelerometer in order to identify a situation in which wheel slip is occurring.

In some known vehicles, vehicle reference speed is taken to be the speed of the slowest turning wheel, i.e. the minimum (lowest) measured wheel speed is used as the vehicle reference speed. In some other known vehicles, vehicle reference speed is set equal to the speed of the second slowest turning wheel.

The present applicant has considered the use of such methods of calculating vehicle reference speed and in addition the use of mean driving wheel speed as the reference speed. In particular, in the context of use of such methods of calculating reference speed in a traction control system and an off-road speed control system, when a vehicle is driving in off-road conditions in which surface mu conditions vary.

It is to be understood that if a vehicle has four driving wheels and employs minimum wheel speed as the reference speed for a traction control system, a situation might arise in which up to three of the driving wheels rotate at a speed sufficient to cause the traction control system to intervene to reduce slip, before the traction control system intervenes to reduce slip of those wheels. Slip of three driving wheels on a driving surface may cause not inconsiderable degradation of an off-road driving surface such as mud or grass.

In a four wheel drive vehicle employing mean wheel speed as the vehicle reference speed, no wheel will be controlled to rotate faster than four times the vehicle reference speed. A scenario in which a wheel rotates at up to four times vehicle reference speed under the control of the speed control system may arise for example where a vehicle attempts to accelerate from rest when one wheel is on a driving surface of relatively low surface coefficient of friction (mu) such as wet ice or wet grass whilst the other three wheels are on a driving surface of relatively high mu such as rock or asphalt. It will be appreciated that wheel rotation at up to four times vehicle reference speed may cause substantial degradation of an off-road driving surface.

In the contrary situation where one wheel is on a high-mu surface and three wheels are on a low-mu surface, slip of up to 4/3 of the vehicle reference speed may occur.

Considering a general case of a vehicle having N driving wheels, and in which mean wheel speed is employed by a speed control system to determine actual vehicle speed, the speed control system attempts to make actual vehicle speed equal to the target speed. In the worst case scenario where three wheels are on a surface having a surface coefficient of friction (mu) of substantially one and one wheel is on surface having a surface coefficient of friction of substantially zero, the wheel on the surface where mu is substantially zero may be caused to rotate at a speed of up to N times the target speed, i.e. four times the target speed in a vehicle having four wheels. In a low speed control system, it is conceivable that this speed may be insufficient to trigger a traction control system to intervene to reduce wheel slip. Accordingly, the wheel on the surface where mu is substantially zero may rotate at a speed of up to N times the target speed until a driver intervenes.

In the contrary scenario, in a vehicle having N driving wheels (i.e. N wheels driven by a powertrain), where (N−1) wheels are resting on a surface having a surface coefficient of friction of substantially zero, and an Nth wheel is resting on a surface having a surface coefficient of friction of unity, the (N−1) slipping wheels may be controlled by the speed control system to travel at a speed of N/(N−1) times the target speed. For a four wheel drive vehicle having four road wheels (i.e. a 4×4 vehicle), if the vehicle has three slipping wheels then the slipping wheels may be controlled to rotate at a speed of up to 4/3 the target speed. It is to be understood that, again, in a low speed control system it is conceivable that this speed may be insufficient to trigger a traction control system to intervene to reduce wheel slip. Accordingly, the wheels on the surface where mu is substantially zero may rotate at a speed of up to N/(N−1) times the target speed until a driver intervenes.

It the number of non-slipping wheels increases, then the speed of the remaining slipping wheels may be higher than 4/3 times the target speed.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR) (RTM) System or controller. The driving modes may also be referred to as terrain modes, terrain response modes, or control modes.

SUMMARY OF THE INVENTION

Embodiments of the invention may be understood with reference to the appended claims.

Aspects of the present invention provide a system, a vehicle and a method.

In one aspect of the invention for which protection is sought there is provided a vehicle control system comprising a speed control system and a slip control system, the slip control system being operable to cause a reduction in speed of one or more wheels when an amount of slip of the one or more wheels exceeds a slip control system intervention threshold value, the speed control system being operable in an active state in which the speed control system causes the vehicle to operate in accordance with a target speed value, wherein when the speed control system is in the active state, the slip control system intervention threshold value is set to a value in dependence at least in part on the target speed value.

The slip control system may be or comprise or be comprised by a traction control (TC) system. The slip control system intervention threshold value may be a TC system intervention threshold value.

In one aspect of the invention for which protection is sought there is provided a vehicle control system comprising a speed control system and a traction control (TC) system, the TC system being operable to cause a reduction in speed of one or more wheels when an amount of slip of the one or more wheels exceeds a TC system intervention threshold value, the speed control system being operable in an active state in which the speed control system causes the vehicle to operate in accordance with a target speed value, wherein when the speed control system is in the active state, the TC system intervention threshold value is set to a value in dependence at least in part on the target speed value.

In one aspect of the invention for which protection is sought there is provided a vehicle control system comprising a speed control system and a traction control (TC) system, the TC system being operable to cause a reduction in speed of one or more wheels when a speed of the one or more wheels exceeds a TC system intervention threshold value, the speed control system being operable in an active state in which the speed control system causes the vehicle to operate in accordance with a target speed value, wherein when the speed control system is in the active state, the TC system intervention threshold value is set to a value selected in dependence at least in part on the target speed value.

Embodiments of the present invention have the advantage that because the TCS intervention threshold is set in dependence on the target speed of the speed control system, the TCS may be caused to intervene in reducing excessive slip at lower values of slip than would be the case with a conventional TCS in which the intervention threshold value is not determined in dependence on the target speed. This has the advantage that degradation of terrain over which the vehicle is traveling may be reduced. In some embodiments, off-road traction may be enhanced.

The present inventors have recognised that a vehicle speed control system operable to control speed at relatively low speeds, including speeds below 20 km/h, by application of positive powertrain torque as well as braking as required, would be highly advantageous in reducing driver workload whilst driving off road. Advantageously such a system would not cancel operation in the event that a TC system intervened to reduce slip, since intervention by a TC system to reduce slip may occur frequently when driving in certain off-road conditions. Such an off-road speed control system may be capable of enhancing vehicle composure.

In order to overcome the limitations of the use of known TC systems when a vehicle speed control system is active, embodiments of the present invention cause the TC system to take the target speed of the speed control system into account when determining the most likely value of instant vehicle speed. Embodiments of the present invention therefore take advantage of the knowledge of an upper limit of vehicle speed that has been imposed by the speed control system in order to reduce an error between the value of vehicle reference speed employed by the TC system and vehicle ground speed.

Advantageously the system may be configured to determine a vehicle reference speed value, the vehicle reference speed value being an estimated speed of the vehicle over ground.

The system may determine vehicle reference speed by receiving a value of vehicle reference speed from an external source such as a reference speed calculating device or system not forming part of the vehicle control system. Alternatively the system may calculate a value of vehicle reference speed using a value of one or more wheel speeds.

Advantageously, when the speed control system is active the TC system intervention threshold value may be set to a value determined in dependence on the value of the lower of the target speed value and the vehicle reference speed value.

Optionally, when the speed control system is not controlling vehicle speed the TC system intervention threshold value may be set to a first TC system intervention threshold value.

Optionally, the first TC system intervention threshold value is determined in dependence at least in part on the vehicle reference speed value.

Optionally, the TC system intervention threshold value is a wheel speed value relative to a stationary wheel condition, wherein when the speed control system is controlling vehicle speed the TC intervention threshold value is set to a value substantially equal to the lower of the target speed value multiplied by an intervention factor and the first TC system intervention threshold value.

Optionally, the first TC system intervention threshold value is a wheel speed value relative to a stationary wheel condition, and wherein the first TC system intervention threshold value is substantially equal to the reference speed value plus a first intervention offset value.

The first intervention offset value may be a value in the range from substantially 2 kph to 10 kph, optionally in the range from substantially 4 kph to substantially 10 kph. Optionally the first intervention offset value is a value substantially equal to 3 kph, 5 kph, 10 kph or any other suitable value.

Alternatively the first intervention offset value may be a proportion of the vehicle reference speed value, such as 5%, 10% or any other suitable value.

Optionally, the TC system intervention threshold value and/or first TC system intervention threshold value correspond to a wheel speed value relative to the vehicle reference speed value, the TC system being operable to cause a reduction in speed of one or more wheels when a speed of the one or more wheels relative to the vehicle reference speed value exceeds the TC system intervention threshold value.

That is, one or both of the threshold values may correspond to an amount of slip of a wheel at a given moment in time. The wheel speed value may be given as a proportion of vehicle reference speed, such as 10% (or 0.1) or 20% (0.2). Alternatively the wheel speed value may be given as a value of wheel speed in excess of vehicle reference speed, such as a speed of 5 kph, 1 kph or any other suitable value. Other arrangements may be useful in some embodiments.

Optionally, the speed control system is operable to cause the vehicle to operate in accordance with the target speed value, the speed control system being arranged to employ a speed control system reference speed value to determine instant vehicle speed.

Optionally, the speed control system reference speed value may be set substantially equal to a value determined in dependence on the mean speed of the driving wheels.

The speed control system reference speed value may be set substantially equal to a mean speed of the driving wheels.

Optionally, the speed control system reference speed value is set substantially equal to the speed of the slowest turning driving wheel.

Optionally, the vehicle reference speed value and speed control system reference speed value are substantially the same.

Thus, it is to be understood that the vehicle reference speed value may be employed by the speed control system as the speed control system reference speed value. Optionally, therefore, the vehicle reference speed value is set substantially equal to the mean speed of the driving wheels.

Optionally, when the vehicle is configured for driving with N driving wheels the intervention factor is set to a value greater than 1 and less than N/(N−1). It is to be understood that, optionally, the intervention factor may be set to a value in this range only if the value of reference speed employed by the speed control system is the mean speed of the N wheels.

Thus, optionally, when the vehicle is configured for driving with four driving wheels the intervention factor is set to a value greater than 1 and less than 4/3.

Optionally, when the vehicle is configured for driving with four driving wheels the intervention factor is set to a value in the range from 1.1-1.3.

Optionally, when the vehicle is configured for driving with N driving wheels and M non-driving wheels the intervention factor is set to a value greater than 1 and less than (N+M)/(N−1). It is to be understood that, optionally, the intervention factor may be set to a value in this range only if the value of reference speed employed by the speed control system is the mean speed of the N+M wheels.

Optionally, in the active state the speed control system is operable to cause the vehicle to operate in accordance with a target speed value by causing the vehicle to travel at a speed substantially equal to the target speed value.

Optionally, in the active state the speed control system is operable to cause the vehicle to operate in accordance with a target speed value by causing the speed control system reference speed value to be substantially equal to the target speed value.

Optionally, the speed control system is operable to cause a vehicle to operate in accordance with a target speed value by controlling an amount of brake torque applied by a braking system and an amount of drive torque applied by a powertrain to one or more wheels of the vehicle.

Optionally, the TC system is operable to cause the reduction in wheel speed at least in part by application of brake torque to the one or more wheels by means of a braking system.

The brake torque may be provided by a friction braking system and/or a regenerative braking system.

Optionally, the TC system is operable to cause the reduction in wheel speed at least in part by causing a reduction in an amount of powertrain torque applied to the one or more wheels.

Optionally, TC system intervention threshold value is set to a value determined in dependence at least in part on the target speed value at least when the target speed value is less than a vehicle reference speed value, the reference speed value corresponding to an estimated speed of the vehicle over ground.

In a further aspect of the invention for which protection is sought there is provided a vehicle control system comprising a speed control system and a traction control (TC) system, the TC system being operable to cause a reduction in speed of one or more wheels when a speed of the one or more wheels exceeds a TC system intervention threshold value, the speed control system being operable in an active state in which the speed control system causes the vehicle to operate in accordance with a target speed value, wherein at least when the target speed value is less than a vehicle reference speed value, the reference speed value corresponding to an estimated speed of the vehicle over ground, the TC system intervention threshold value is set to a value determined in dependence at least in part on the target speed value.

In a still further aspect of the invention for which protection is sought there is provided a motor vehicle comprising a control system according to a preceding aspect.

The vehicle may be operable in at least one of a four wheel drive configuration, in which four of the wheels are driving wheels driven by a powertrain, and a two wheel drive mode, in which only two of the wheels are driving wheels driven by the powertrain.

In an aspect of the invention for which protection is sought there is provided a method of controlling a vehicle by means of a speed control system and a traction control (TC) system, the method comprising causing by means of the TC system a reduction in speed of one or more wheels when a speed of the one or more wheels exceeds a TC system intervention threshold value; and when the speed control system is in an active state, causing the vehicle to operate in accordance with a target speed value and setting the TC system intervention threshold value to a value selected in dependence at least in part on the target speed value.

The method may comprise determining a vehicle reference speed value, the vehicle reference speed value corresponding to an estimated speed of the vehicle over ground.

Optionally, when the speed control system is active the method comprises setting the TC system intervention threshold value to a value determined in dependence on the value of the lower of the target speed value and the vehicle reference speed value.

Optionally, when the speed control system is not controlling vehicle speed the method comprises setting the TC system intervention threshold value to a first TC system intervention threshold value.

Optionally, when the speed control system is controlling vehicle speed the method comprises setting the TC intervention threshold value to a value substantially equal to the lower of the target speed value multiplied by an intervention factor and the first TC system intervention threshold value.

The method may comprise determining the first TC system intervention threshold value in dependence at least in part on vehicle reference speed value.

The method may comprise setting the first TC system intervention threshold value to a value substantially equal to the reference speed value plus a first intervention offset value.

The method may comprise causing the vehicle to operate in accordance with the target speed value, whereby causing the vehicle to operate in accordance with the target speed value comprises employing a speed control system reference speed value to determine instant vehicle speed.

The method may comprise setting the speed control system reference speed value to a value determined in dependence on a mean speed of the driving wheels, optionally setting the speed control system reference speed value to a value substantially equal to the mean speed of the driving wheels.

Optionally, the speed control system reference speed value is set substantially equal to the speed of the slowest turning driving wheel.

Optionally, the vehicle reference speed value and speed control system reference speed value are substantially the same value. For example, the speed control system may employ the vehicle reference speed value to determine vehicle speed at a given moment in time. Equivalently, the control system may set a speed control system reference speed value substantially equal to the vehicle reference speed value, or calculate the speed control system reference speed value by the same method as that employed to calculate the vehicle reference speed value.

Optionally, the vehicle is configured for driving with N driving wheels and the intervention factor is set to a value greater than 1 and less than $N/(N-1)$.

Optionally, the vehicle is configured for driving with four driving wheels and the intervention factor is set to a value greater than 1 and less than 4/3.

Optionally, the vehicle is configured for driving with four driving wheels and the intervention factor is set to a value in the range from 1.1-1.3.

Optionally, in the active state the speed control system is operable to cause the vehicle to operate in accordance with a target speed value by causing the vehicle to travel at a speed substantially equal to the target speed value.

Optionally, in the active state the speed control system is operable to cause the vehicle to operate in accordance with a target speed value by causing the speed control system reference speed value to be substantially equal to the target speed value. Thus vehicle speed is controlled such that the reference speed value is substantially equal to the target speed value.

The method may comprise causing the vehicle to operate in accordance with a target speed value by controlling an amount of brake torque applied by a braking system and an amount of drive torque applied by a powertrain to one or more wheels of the vehicle.

The method may comprise causing the TC system to cause the reduction in wheel speed at least in part by application of brake torque to the one or more wheels by means of a braking system.

Optionally, the method comprises causing the TC system to cause the reduction in wheel speed at least in part by causing a reduction in an amount of powertrain torque applied to the one or more wheels.

In one aspect of the invention for which protection is sought there is provided a vehicle control system comprising a speed control system and a traction control (TC) system, the TC system being operable to cause a reduction in speed of one or more wheels when an amount of slip of the one or more wheels exceeds a TC system intervention threshold value, the speed control system being operable in an active state in which the speed control system causes the vehicle to operate in accordance with a target speed value, wherein when the speed control system is in the active state, the TC system intervention threshold value is set to a value determined in dependence at least in part on the target speed value.

In a further aspect of the invention for which protection is sought there is provided a method of controlling a vehicle by means of a speed control system and a traction control (TC) system, the method comprising causing by means of the TC system a reduction in speed of one or more wheels when an amount of slip of the one or more wheels exceeds a TC system intervention threshold value; and when the speed control system is in an active state, causing the vehicle to operate in accordance with a target speed value and setting the TC system intervention threshold value to a value determined in dependence at least in part on the target speed value.

Some embodiments of the present invention provide a vehicle control system comprising a speed control system and a traction control (TC) system, the TC system being operable to cause a reduction in speed of one or more wheels when an amount of slip of the one or more wheels exceeds a TC system intervention threshold value. The speed control system may be operable in an active state in which the speed control system causes the vehicle to operate in accordance with a target speed value. When the speed control system is in the active state, the TC system intervention threshold value is set to a value in dependence at least in part on the target speed value.

In one aspect of the invention for which protection is sought there is provided a vehicle control system comprising a speed control system and a slip control system, the slip control system being operable to cause a reduction in speed of one or more wheels when an amount of slip of the one or more wheels exceeds a slip control system intervention threshold value, the speed control system being operable in an active state in which the speed control system causes the vehicle to operate in accordance with a target speed value, wherein when the speed control system is in the active state, the slip control system intervention threshold value is set to a value in dependence at least in part on the target speed value.

In a further aspect of the invention for which protection is sought there is provided a vehicle control system comprising a speed control system and a traction control (TC) system, the TC system being operable to cause a reduction in speed of one or more wheels when an amount of slip of the one or more wheels exceeds a TC system intervention threshold value, the speed control system being operable in an active state in which the speed control system causes the vehicle to operate in accordance with a target speed value, wherein at least when the target speed value is less than a vehicle reference speed value, the reference speed value corresponding to an estimated speed of the vehicle over ground, the TC system intervention threshold value is set to a value determined in dependence at least in part on the target speed value.

In an aspect of the invention for which protection is sought there is provided a method of controlling a vehicle by means of a speed control system and a traction control (TC) system, the method comprising causing by means of the TC system a reduction in speed of one or more wheels when an amount of slip of the one or more wheels exceeds a TC system intervention threshold value; and when the speed control system is in an active state, causing the vehicle to operate in accordance with a target speed value and setting the TC system intervention threshold value to a value in dependence at least in part on the target speed value.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
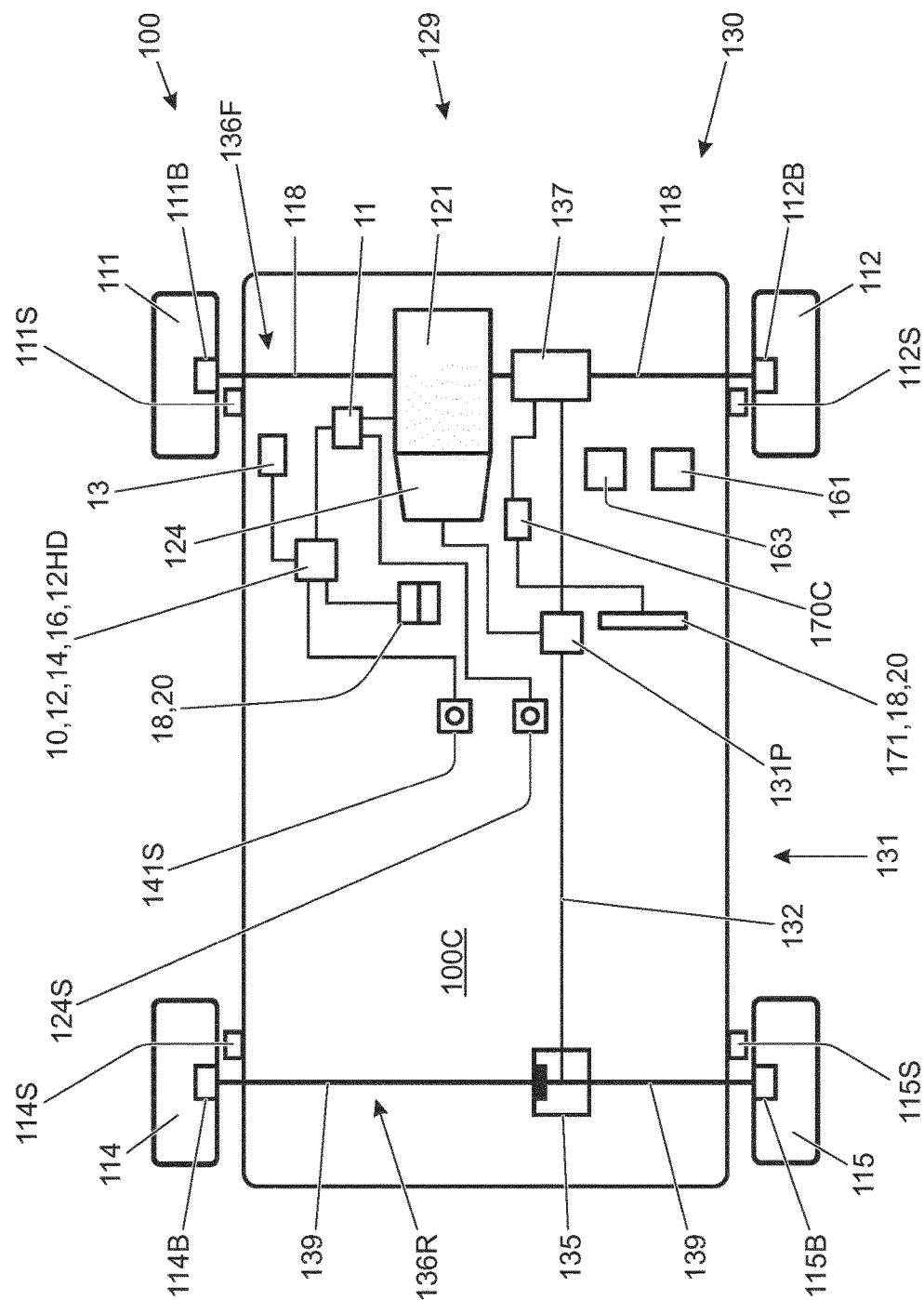
FIG. 1 is a schematic illustration of a vehicle according to an embodiment of the invention in plan view.
Figure 2:
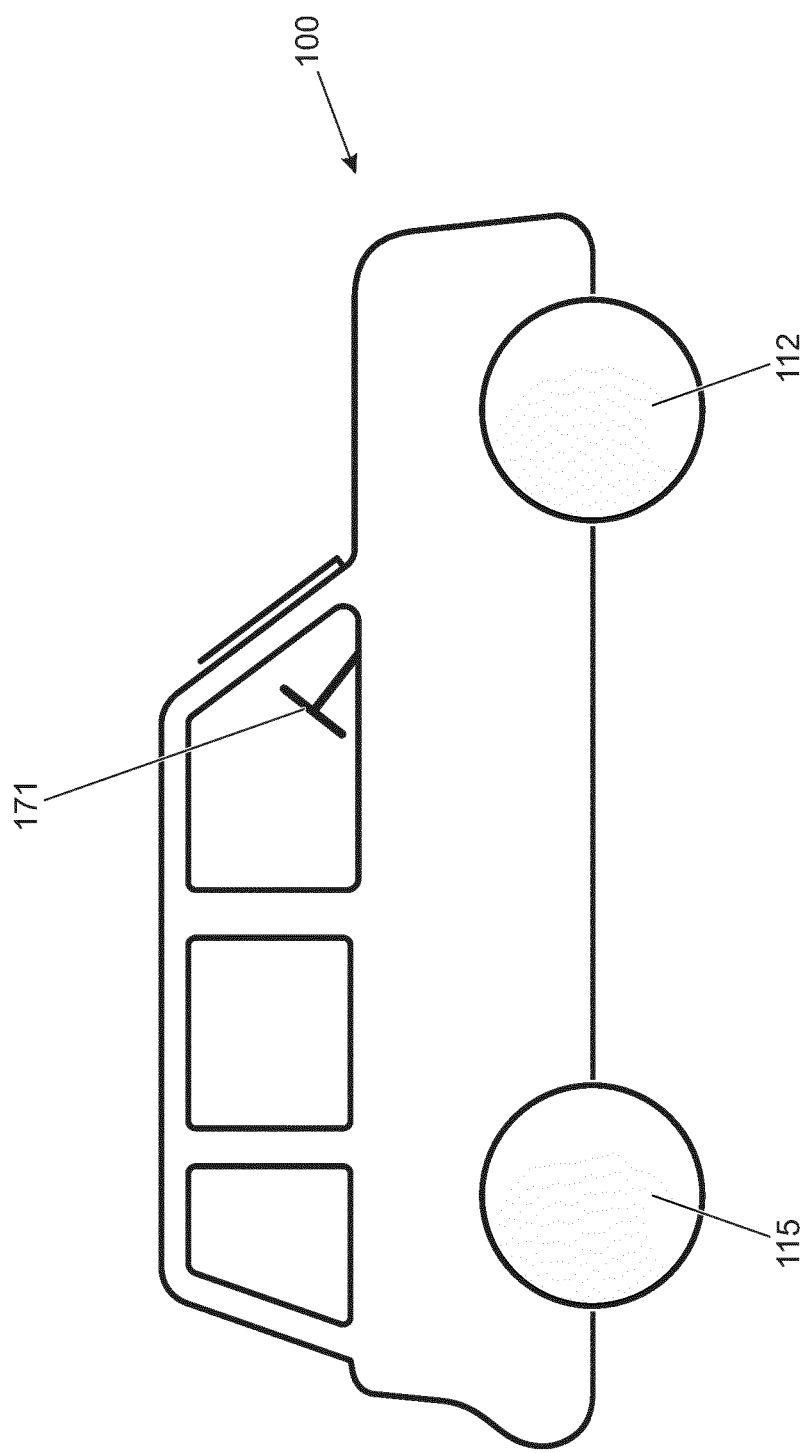
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
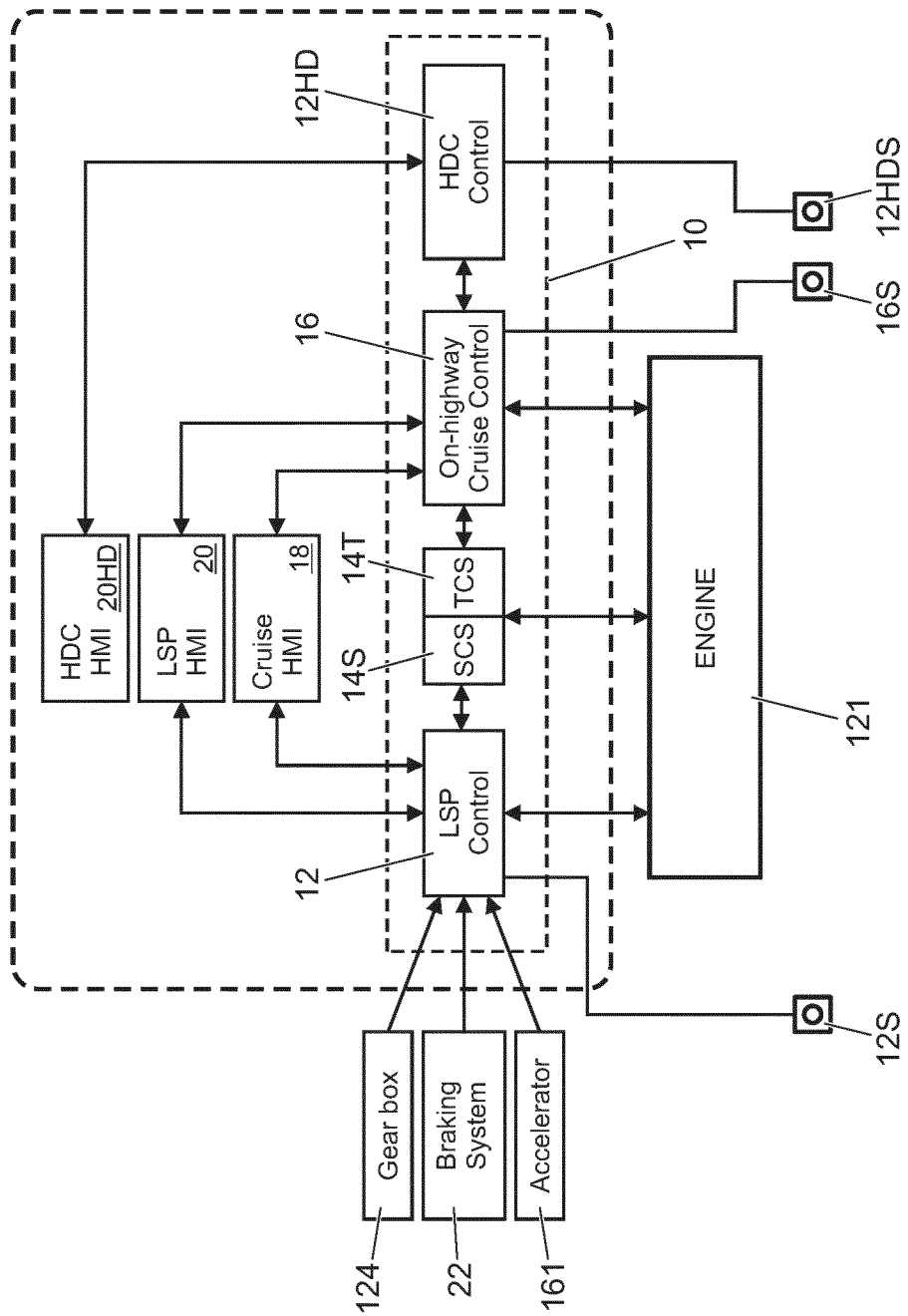
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel. If excessive wheel spin is detected, the TCS 14T is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by separate controllers.

The SCS 14S, TCS 14T, ABS controller 22C and HDC system 12HD provide outputs indicative of, for example, SCS activity, TCS activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be present.

Figure 5:
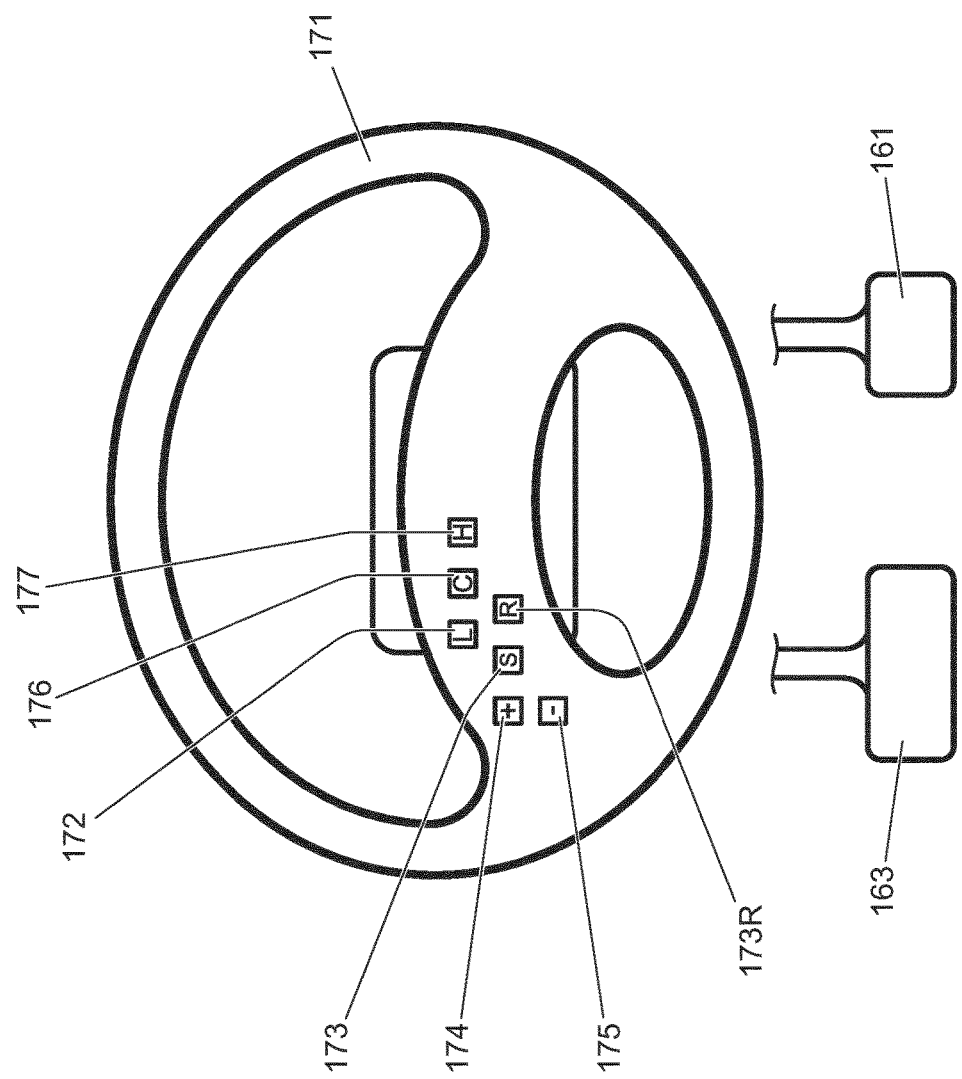
FIG. 5 illustrates a steering wheel and brake and accelerator pedals of a vehicle according to an embodiment of the present invention.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR) (RTM) System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may optionally also increase or decrease the vehicle set-speed by lightly pressing the accelerator or brake pedals 161, 163 respectively. In some embodiments, with the LSP control system 12 in the active condition the '+' and '−' buttons 174, 175 may be disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
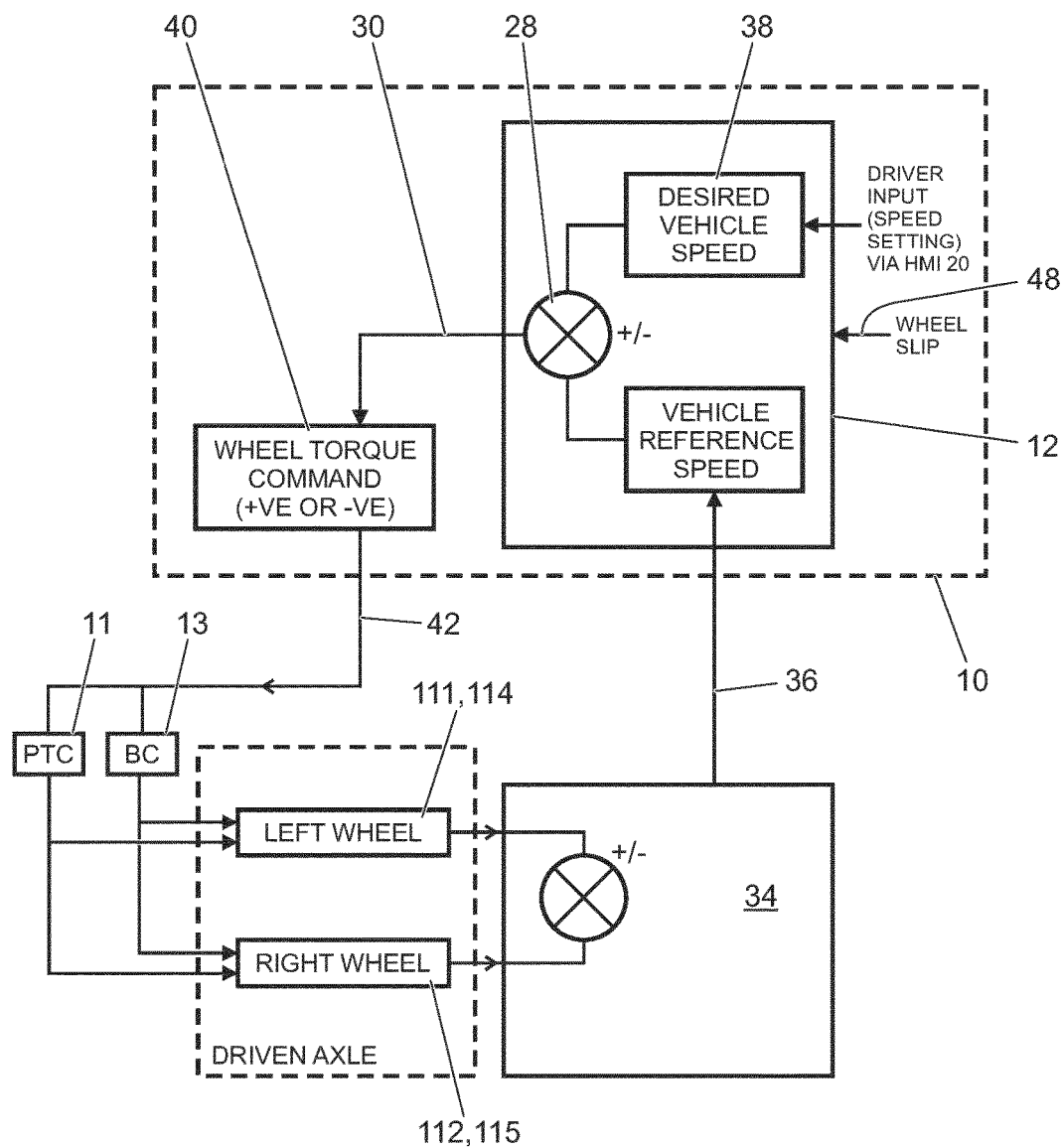
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14S generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 1, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499252, the contents of each of which is incorporated herein by reference.

The nature of the terrain over which the vehicle is travelling (as determined by reference to the selected control mode) may also be utilised in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

As described above, the VCU 10 is configured to implement a TCS 14T in which the VCU 10 commands selective application of brake force to one or more wheels of the vehicle 100 in order to reduce slip of the one or more wheels when certain conditions are met.

It is to be understood that in some embodiments the TCS 14T may, in addition to or instead of commanding application of brake force, cause a reduction in powertrain torque applied to one or more wheels, for example by causing a reduction in engine speed, by causing slip of one or more powertrain clutches or by any other suitable method. Intervention by the TCS 14T to reduce slip is referred to herein as a 'TC event'. It is to be understood that the LSP control system 12 remains active when a TC event takes place, i.e. the LSP control system 12 does not cancel speed control following a TC event. In contrast, in the case of a conventional cruise control system such as cruise control system 16, speed control by the cruise control system 16 is immediately suspended if a TC event occurs.

When the LSP control system 12 is not active, the TCS 14T is arranged to intervene and cause application of brake force to reduce wheel speed if a difference (or error) between measured wheel speed and a vehicle reference speed v_ref exceeds a prescribed value, TC_offset, which may be referred to as a TC intervention threshold value or TC offset value. In the present embodiment the TC intervention threshold value TC_offset is substantially 5 kph. The vehicle reference speed v_ref is calculated by a vehicle reference speed calculation function which is also implemented by the VCU 10. The vehicle reference speed calculation function calculates the vehicle reference speed by a known methodology based on a speed of the second slowest turning wheel and a measurement of vehicle longitudinal acceleration. Examples of known methodologies for calculating a value of v_ref include those described in U.S. Pat. No. 5,719,770 referred to above. In some embodiments, the vehicle reference speed calculation function is configured to set the value of v_ref substantially equal to the speed of the second slowest turning wheel of the vehicle.

In some embodiments, the TCS 14 may be triggered based on a value of slip, for example based on the proportion of vehicle speed (given by the vehicle reference speed value) by which wheel speed exceeds vehicle speed, such as a percentage of vehicle reference speed or any other suitable value. The TCS 14 may for example by configured to be triggered when the value of slip exceeds a predetermined value such as 10%, 20% or any other suitable value.

The LSP control system 12 is configured to control the vehicle 100 to travel at a speed substantially equal to LSP_set-speed subject to any requirement to reduce speed below this value, for example in dependence on the nature of terrain over which the vehicle 100 is travelling as described above. It is to be understood that the LSP control system 12 calculates the mean value of the instant speed of each of the four wheels of the vehicle 100 at a given moment in time, v_mean_wheel, and uses this value as an LSP control system reference value of vehicle ground speed. That is, in the present embodiment the LSP control system 12 assumes that the instant ground speed of the vehicle 100 is substantially equal to v_mean_wheel.

As noted above, when the LSP control system 12 is in a state other than the active state, the TC function triggers a TC event if the speed of any driving wheel is greater than that of the vehicle reference speed v_ref calculated by the vehicle reference speed calculation function by more than the TC intervention threshold value TC_offset. The TC function therefore triggers application of the braking system 22 to reduce the speed of any wheel whose speed exceeds the vehicle reference speed v_ref by more than the TC intervention threshold value, i.e. by more than v_ref+TC_offset.

However, if the LSP control system 12 is in the active state, the TC function triggers a TC event if the speed of any driving wheel exceeds a LSP_TC_speed_trigger value. In the present embodiment, the LSP_TC_speed_trigger value is set to be the lower of (a) vehicle target speed multiplied by an intervention factor, LSP_TC_intervention_factor, i.e. a value (LSP_set-speed×LSP_TC_intervention_factor), and (b) v_ref+TC_offset. In the vehicle 100 of the present embodiment, the value of LSP_TC_intervention_factor is set to a value of 1.25 (being a value slightly less than 4/3) since the vehicle 100 is arranged to operate with the LSP control system 12 active only when the powertrain 129 is in the four wheel drive configuration, and the value of TC_offset is set to 5 kph.

It is to be understood that, equivalently, in some embodiments, when the LSP control system is in a state other than the active state, the TC function may still trigger a TC event in dependence on the LSP_TC_speed_trigger value, but in this case the LSP_TC_speed_trigger value may be set substantially equal to v_ref+TC_offset.

It is to be understood that other values of LSP_TC_intervention factor and/or TC_offset are also useful. In particular, in the case of a vehicle having four driven wheels and for which the LSP control system 12 employs mean wheel speed v_mean_wheel as the reference speed, values of LSP_TC_intervention_factor of less than 4/3 are especially useful. This is because otherwise, in the event the vehicle encounters a situation in which three wheels experience slip due to a driving surface of relatively low mu whilst a fourth wheel experiences a driving surface of relatively high mu and little or substantially no slip, the LSP control system 12 might continue to cause the three wheels to rotate at a speed of substantially 4/3 the target speed LSP_set-speed whilst the vehicle remains stationary, the TCS system 14T failing to intervene to reduce slip because the threshold value of slip for activation of the TCS system 14T is greater than 4/3 the target speed LSP_set-speed.

It is to be understood that, in the general case, the LSP_TC_intervention_factor may be set to a different value in dependence on the number of wheel speeds used to calculate v_mean_wheel. In the case of a vehicle in which N wheel speeds are employed, the value of LSP_TC_Intervention factor may be set to a value greater than 1 and less than or substantially equal to N/(N−1), optionally a value greater than 1 and less than N/(N−1).

In a further general case, in the case of a vehicle in which there are N driving wheels and M non-driving wheels, and an average of N+M wheel speeds is employed, the value of LSP_TC_Intervention factor may be set to a value greater than 1 and less than or substantially equal to (N+M)/(N−1), optionally a value greater than 1 and less than (N+M)/(N−1).

In embodiments in which a vehicle 100 is operating with four wheels, each of which is a driving wheel, and in which the LSP control system 12 employs v_mean_wheel as the instant value of vehicle speed, the value of LSP_TC_intervention_factor is advantageously set to a value less than 4/3 but greater than 1. Values close to 4/3 may be particularly advantageous in some embodiments, for example values in the range from 1.25 to 1.3.

As noted above, the significance of the value 4/3 is that by employing mean wheel speed v_mean_wheel as the LSP control system reference speed, and by setting the value of LSP_TC_intervention_factor to a value less than 4/3, a TC event will be triggered prior to the speed of any wheel exceeding 4/3 of the target speed. Thus a situation may be avoided in which the LSP control system 12 is permitted to cause v_mean_wheel to reach a value substantially equal to LSP_set-speed whilst the vehicle 100 remains substantially stationary with one or more wheels also substantially stationary.

Thus the LSP control system 12 and TC function both act to prevent wheel speed exceeding an upper limit of 4/3 the target speed value, and to control wheel slip in some instances to a wheel speed between 1 and 4/3 of target speed value.

It is to be understood that in some embodiments of the present invention the traction control function (or traction control system) is supplied with a value of instant target speed of the vehicle 100 and an indication whether or not the LSP control system 12 is operating in an active mode. It is to be understood that the value of target speed of the LSP control system 12 will typically be substantially equal to the value of LSP_set-speed unless a lower limit of target speed has been imposed as described above.

Figure 6:
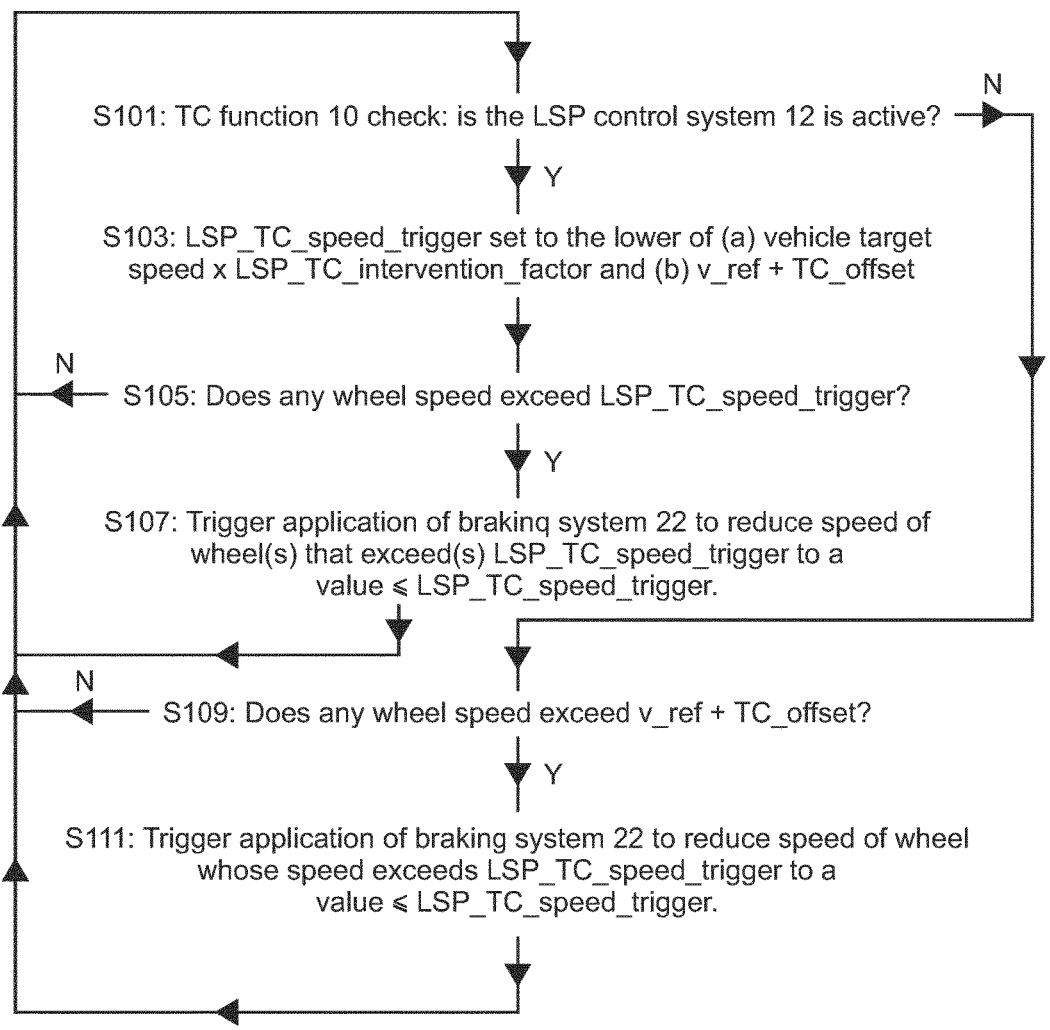
FIG. 6 is a flowchart illustrating operation of a vehicle according to an embodiment of the present invention.

Operation of a TC function according to an embodiment of the present invention will now be described by reference to the flow diagram of FIG. 6.

At step S101 the TC function determines whether the LSP control system 12 is in the active configuration. If the TC function determines that the LSP control system 12 is in the active configuration, the method continues at step S103 else the method continues at step S109.

At step S103, the value of parameter LSP_TC_speed_trigger is set to the lower of (a) vehicle target speed× LSP_TC_intervention_factor and (b) v_ref+TC_offset. The method then continues at step S105.

At step S105 the TC function checks whether the value of any wheel speed exceeds that of LSP_TC_speed_trigger.

If at step S105 the TC function determines that one or more wheel speeds exceed LSP_TC_speed_trigger, the method continues at step S107.

At step S107 the TC function commands the brake controller 13 to cause application of a brake of the braking system 22 to the one or more wheels to reduce the wheel speed to a value at or below the value LSP_TC_speed_trigger. The method then continues at step S101.

If at step S105 it is determined that no wheel speed exceeds LSP_TC_speed_trigger, the method continues at step S101.

As noted above, if at step S101 it is determined that the LSP control system 12 is not in the active configuration, the method continues at step S109.

At step S109 the TC function determines whether any wheel speed exceeds v_ref+TC_offset. If at step S109 it is determined that no wheel speed exceeds v_ref+TC_offset, the method continues at step S101.

If at step S109 it is determined that one or more wheel speeds exceed v_ref+TC_offset, the method continues at step S111.

At step S111 the TC function commands the brake controller to cause application of a brake of the braking system 22 to the one or more wheels identified in step S109 as exceeding v_ref+TC_offset to reduce the wheel speed to a value at or below the value v_ref+TC_offset.

The method then continues at step S101.

It will be appreciated that in the steps above, where the application of a brakes to reduce the speed of individual wheels when slip occurs is described, alternative arrangements may reduce wheel speed by other methods, for example by reducing positive torque to the wheels, or by regenerative or engine braking.

Embodiments of the present invention have the advantage that when a vehicle is operating with speed controlled by an off-road speed control system that does not cancel operation when a traction control system intervenes to reduce slip, a traction control function or system is able to intervene to reduce excessive wheel slip at lower values of wheel slip than in the case of known traction control arrangements, at least under certain circumstances. This has the advantage that an amount of degradation of terrain over which the vehicle is moving may be reduced and off-road traction enhanced.

The reduction in the amount of slip that occurs before the traction control function intervenes to reduce slip is made possible at least in part because the traction control function or system is provided with the value of target speed in accordance with which the speed control system is causing the vehicle to operate. Thus, the traction control function or system is able to use the knowledge of the speed that the speed control system is attempting to control the vehicle to operate at in order to refine an estimate of the instant value of vehicle speed over ground.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle control system comprising a speed control system and a traction control system,
   the traction control system being operable to cause a reduction in speed of one or more wheels when a speed of the one or more wheels exceeds a traction control system intervention threshold value,
   the speed control system being operable in an active state in which the speed control system causes the vehicle to operate in accordance with a target speed value,
   wherein one or more processors maintains the speed control system in the active state when the traction control system causes the reduction in speed of the one or more wheels, thereby preventing the speed control system from being deactivated by the traction control system intervention; and
   wherein when the speed control system is not controlling vehicle speed the method comprises the one or more processors setting the traction control system intervention threshold value to a first traction control system intervention threshold value and when the speed control system is controlling vehicle speed the method comprises the one or more processors setting the traction control intervention threshold value to a value determined in dependence on the lower of the target speed value multiplied by an intervention factor and the first traction control system intervention threshold value, wherein the traction control system is reducing the slip while the speed control system is controlling vehicle speed without deactivating the speed control system, thereby enhancing traction control.

2. A system according to claim 1 configured to determine a vehicle reference speed value, the vehicle reference speed value being an estimated speed of the vehicle over ground and wherein when the speed control system is active the traction control system intervention threshold value is set to a value determined in dependence on the value of the lower of the target speed value and the vehicle reference speed value.

3. A system according to claim 2 wherein when the speed control system is not controlling vehicle speed the traction control system intervention threshold value is set to a first traction control system intervention threshold value the first traction control system intervention threshold value is determined in dependence at least in part on the vehicle reference speed value.

4. A system according to claim 3 wherein the traction control system intervention threshold value is a wheel speed value relative to a stationary wheel condition, wherein when the speed control system is controlling vehicle speed the traction control intervention threshold value is set to a value equal to the lower of the target speed value multiplied by an intervention factor and the first traction control system intervention threshold value.

5. A system according to claim 2 wherein the speed control system is configured to cause the vehicle to operate in accordance with the target speed value, the speed control system being arranged to employ a speed control system reference speed value to determine instant vehicle speed, and wherein the speed control system reference speed value is set equal to one of a mean speed of the driving wheels, and the speed of the slowest turning driving wheel.

6. A system according to claim 5 wherein the traction control system intervention threshold value is a wheel speed value relative to a stationary wheel condition, wherein when the speed control system is controlling vehicle speed the traction control intervention threshold value is set to a value equal to the lower of the target speed value multiplied by an intervention factor and the first traction control system intervention threshold value, and when the vehicle is configured for driving with N driving wheels the intervention factor is set to a value greater than 1 and less than $N/(N-1)$.

7. A system according to claim 6 wherein when the vehicle is configured for driving with four driving wheels the intervention factor is set to a value in the range from 1.1-1.3.

8. A system according to claim 1 wherein the first traction control system intervention threshold value is a wheel speed value relative to a stationary wheel condition, and wherein the first traction control system intervention threshold value is equal to the reference speed value plus a first intervention offset value.

9. A system according claim 1 wherein the traction control system intervention threshold value and/or first traction control system intervention threshold value correspond to a wheel speed value relative to the vehicle reference speed value, the traction control system being operable to cause a reduction in speed of one or more wheels when a speed of the one or more wheels relative to the vehicle reference speed value exceeds the traction control system intervention threshold value.

10. A system according to claim 1 wherein in the active state the speed control system is configured to cause the vehicle to operate in accordance with the target speed value by causing the vehicle to travel at a speed equal to the target speed value and wherein in the active state the speed control system is configured to cause the vehicle to operate in accordance with the target speed value by causing the speed control system reference speed value to be equal to the target speed value.

11. A system according to claim 1 wherein the traction control system intervention threshold value is set to a value determined in dependence at least in part on the target speed value at least when the target speed value is less than a vehicle reference speed value, the reference speed value corresponding to an estimated speed of the vehicle over ground.

12. A motor vehicle, comprising:
a vehicle control system comprising a speed control system and a traction control system,
the traction control system being operable to cause a reduction in speed of one or more wheels when a speed of the one or more wheels exceeds a traction control system intervention threshold value,
the speed control system being operable in an active state in which the speed control system causes the vehicle to operate in accordance with a target speed value,
wherein one or more processors maintains the speed control system in the active state when the traction control system causes the reduction in speed of the one or more wheels, thereby preventing the speed control system from being deactivated by the traction control system intervention; and
wherein when the speed control system is not controlling vehicle speed the one or more processors set the traction control system intervention threshold value to a first traction control system intervention threshold value and when the speed control system is controlling vehicle speed the one or more processors set the traction control intervention threshold value to a value determined in dependence on the lower of the target speed value multiplied by an intervention factor and the first traction control system intervention threshold value, wherein the traction control system is reducing the slip while the speed control system is controlling vehicle speed without deactivating the speed control system, thereby enhancing traction control.

13. A method of controlling a vehicle by means of a speed control system and a traction control system, the method comprising:
causing by means of the traction control system a reduction in speed of one or more wheels when a speed of the one or more wheels exceeds a traction control system intervention threshold value; and
when the speed control system is in an active state, causing the vehicle to operate in accordance with a target speed value and setting the traction control system intervention threshold value to a value selected in dependence at least in part on the target speed value, wherein one or more processors maintains the speed control system in the active state when the traction control system causes the reduction in speed of the one or more wheels, thereby preventing the speed control system from being deactivated by the traction control system intervention;
whereby when the speed control system is not controlling vehicle speed the method comprises the one or more processors setting the traction control system intervention threshold value to a first traction control system intervention threshold value and when the speed control system is controlling vehicle speed the method comprises the one or more processors setting the traction control intervention threshold value to a value determined in dependence on the lower of the target speed value multiplied by an intervention factor and the first traction control system intervention threshold value, wherein the traction control system is reducing the slip while the speed control system is controlling vehicle speed without deactivating the speed control system, thereby enhancing traction control.

14. A method according to claim 13 comprising determining a vehicle reference speed value, the vehicle reference speed value corresponding to an estimated speed of the vehicle over ground.

15. A method according to claim 14 whereby when the speed control system is active the method comprises setting the traction control system intervention threshold value to a value determined in dependence on the value of the lower of the target speed value and the vehicle reference speed value.

16. A method according to claim 13 comprising determining a vehicle reference speed value, the vehicle reference speed value corresponding to an estimated speed of the vehicle over ground determining the first traction control system intervention threshold value in dependence at least in part on vehicle reference speed value and setting the first traction control system intervention threshold value to a value equal to the reference speed value plus a first intervention offset value.

17. A method according to claim 13 comprising causing the vehicle to operate in accordance with the target speed value, whereby causing the vehicle to operate in accordance with the target speed value comprises employing a speed control system reference speed value to determine instant vehicle speed, setting the speed control system reference speed value to a value determined in dependence on one of a mean speed of the driving wheels and the speed of the slowest turning driving wheel, and whereby the vehicle is configured for driving with N driving wheels and the intervention factor is set to a value greater than 1 and less than $N/(N-1)$.

* * * * *